(12) United States Patent
Nelson

(10) Patent No.: US 7,552,009 B2
(45) Date of Patent: Jun. 23, 2009

(54) SYSTEM AND METHOD FOR SYNCHRONIZING DATA FOR USE IN A NAVIGATION SYSTEM

(75) Inventor: Scott David Nelson, Redondo Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 406 days.

(21) Appl. No.: 11/486,940

(22) Filed: Jul. 14, 2006

(65) Prior Publication Data

US 2007/0016362 A1    Jan. 18, 2007

Related U.S. Application Data

(60) Provisional application No. 60/699,458, filed on Jul. 14, 2005.

(51) Int. Cl.
*G01C 21/30* (2006.01)

(52) U.S. Cl. ............ 701/208; 701/35; 701/36; 701/200

(58) Field of Classification Search .......... 701/1, 701/29, 33, 35, 36, 200, 208, 211, 215; 715/203; 707/E17.032

See application file for complete search history.

(56) References Cited

U.S. PATENT DOCUMENTS

| | | |
|---|---|---|
| 5,287,553 A | 2/1994 | Korycan |
| 5,635,897 A | 6/1997 | Kuo |
| 5,781,109 A | 7/1998 | Nakajima |
| 5,787,366 A | 7/1998 | Adams |
| 5,796,338 A | 8/1998 | Mardirossian |
| 5,850,188 A | 12/1998 | Doyle et al. |
| 6,011,471 A | 1/2000 | Huang |
| 6,161,066 A | 12/2000 | Wright et al. |
| 6,163,711 A | 12/2000 | Juntunen et al. |

(Continued)

FOREIGN PATENT DOCUMENTS

DE    10049965    5/2002

(Continued)

OTHER PUBLICATIONS

"MapQuest, OnStar Team Up On Maps", By Jeff Karoub/Associated Press; Detroit News Online; www.detnews.com; Apr. 25, 2007; p. 1.

(Continued)

*Primary Examiner*—Gertrude Arthur Jeanglaud
(74) *Attorney, Agent, or Firm*—O'Melveny & Myers LLP; Mark E. Duell

(57) ABSTRACT

A system for synchronizing data for use in a navigation comprises a computing device and a vehicle onboard computer system. The computing device comprises an associated communication subsystem adapted for wireless communications, a user interface permitting entry of address data, and memory adapted to store the address data. The onboard computer comprises a communication subsystem for wireless communications with the computing device, memory to locally store address data, and a navigation system having a user interface that allows for selection of stored address data. The navigation system calculates a route based upon the selected address, displays the route on the user interface, and synchronizes address data using an information synchronization protocol. Changes or additions to the address data in the computing device are synchronized with local address data of the onboard computer, facilitating selection of addresses for route calculation.

21 Claims, 13 Drawing Sheets

U.S. PATENT DOCUMENTS

| | | | |
|---|---|---|---|
| 6,212,450 | B1 | 4/2001 | Kokubu et al. |
| 6,397,086 | B1 | 5/2002 | Chen |
| 6,462,660 | B1 | 10/2002 | Cannon et al. |
| 6,472,771 | B1 | 10/2002 | Frese et al. |
| 6,674,358 | B1 | 1/2004 | Tinsley |
| 6,677,854 | B2 | 1/2004 | Dix |
| 6,697,638 | B1 | 2/2004 | Larsson et al. |
| 6,757,609 | B2 | 6/2004 | Tsuge et al. |
| 6,836,212 | B2 | 12/2004 | Sawinski |
| 6,885,848 | B2 | 4/2005 | Lee |
| 6,892,051 | B2 | 5/2005 | Schmitt et al. |
| RE38,781 | E | 8/2005 | Sato et al. |
| 6,970,703 | B2 | 11/2005 | Fuchs et al. |
| 7,006,845 | B2 | 2/2006 | Simon |
| 7,093,006 | B2 | 8/2006 | Sanjeev et al. |
| 7,308,642 | B2 * | 12/2007 | Rapakko et al. ............. 715/203 |
| 7,334,726 | B2 * | 2/2008 | Dulgerian et al. ........... 235/382 |
| 2002/0019689 | A1 | 2/2002 | Harrison et al. |
| 2002/0113705 | A1 | 8/2002 | Wallace |
| 2003/0043037 | A1 | 3/2003 | Lay |
| 2003/0182419 | A1 | 9/2003 | Barr et al. |
| 2003/0212479 | A1 | 11/2003 | Baghshomali et al. |
| 2003/0231550 | A1 | 12/2003 | Macfarlane |
| 2004/0044470 | A1 | 3/2004 | Matsuoka et al. |
| 2004/0044472 | A1 | 3/2004 | Tsuge et al. |
| 2004/0093155 | A1 | 5/2004 | Simonds et al. |
| 2004/0110472 | A1 | 6/2004 | Witkowski et al. |
| 2004/0117442 | A1 | 6/2004 | Thielen |
| 2004/0139180 | A1 | 7/2004 | White et al. |
| 2004/0142678 | A1 | 7/2004 | Krasner |
| 2004/0193364 | A1 | 9/2004 | Chojnacki |
| 2004/0204822 | A1 | 10/2004 | Kohno et al. |
| 2004/0224638 | A1 | 11/2004 | Fadell et al. |
| 2005/0047071 | A1 | 3/2005 | Tse Chun Hin |
| 2005/0049021 | A1 | 3/2005 | Nedelcu et al. |
| 2005/0203698 | A1 | 9/2005 | Lee |
| 2005/0237166 | A1 | 10/2005 | Chen |
| 2005/0240343 | A1 | 10/2005 | Schmidt, II et al. |
| 2005/0260993 | A1 | 11/2005 | Lovell, Jr. |
| 2005/0261035 | A1 | 11/2005 | Groskreutz et al. |
| 2006/0036643 | A1 | 2/2006 | Tsuboi |
| 2006/0111140 | A1 | 5/2006 | Wang et al. |
| 2006/0135170 | A1 | 6/2006 | Patenaude |
| 2006/0161315 | A1 * | 7/2006 | Lewis et al. .................... 701/1 |
| 2006/0173614 | A1 | 8/2006 | Nomura |
| 2006/0190170 | A1 | 8/2006 | Piekarz |
| 2006/0211446 | A1 | 9/2006 | Wittmann et al. |
| 2006/0224305 | A1 | 10/2006 | Ansari et al. |
| 2006/0258377 | A1 | 11/2006 | Economos et al. |
| 2006/0293040 | A1 | 12/2006 | Kortge |

FOREIGN PATENT DOCUMENTS

| | | |
|---|---|---|
| DE | 10329871 | 1/2005 |
| EP | 0239066 | 9/1987 |
| JP | 2001045181 | 2/2001 |
| JP | 2003309574 A | 10/2003 |
| JP | 2004306622 | 11/2004 |
| JP | 2005012563 | 1/2005 |
| JP | 2005150863 | 6/2005 |
| KR | 2005098634 | 10/2005 |
| KR | 2005121504 | 12/2005 |
| WO | WO0048412 | 8/2000 |

OTHER PUBLICATIONS

"Ford and Microsoft in Sync for In-Car Infotainment", CNet Reviews; Posted by Kevin Massy; Jan. 7, 2007, 7:15 AM PST; CES 2007: CNet Editors Cover the Best of CES 2007, pp. 1-4; http://reviews.cnet.com/8301-12760_7-9672096-d.html?tag=txt; last visited Jan. 29, 2007.

* cited by examiner

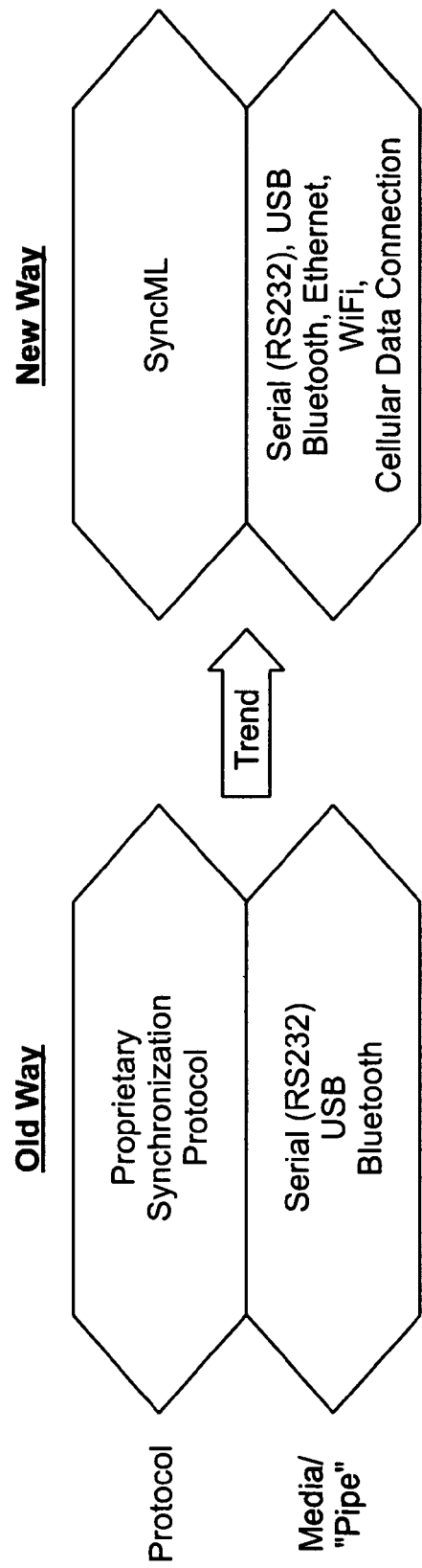

SYSTEM AND METHOD FOR SYNCHRONIZING DATA FOR USE IN A NAVIGATION SYSTEM

CROSS-REFERENCE TO RELATED APPLICATION

This application claims priority pursuant to 35 U.S.C. § 119(e) to U.S. Provisional Application No. 60/699,458, filed Jul. 14, 2005, which application is specifically incorporated herein, in its entirety, by reference.

BACKGROUND OF THE INVENTION

1. Field of the Invention

The present invention relates to a system and method for synchronizing address data for use in a navigation system. More specifically, the invention relates to a system for synchronizing address data between a vehicle onboard computer and a computing device or hosted synchronization server to allow for selection of the address data for use in calculating routes in a navigation system. Additionally, a method of utilizing multiple synchronization protocols to ensure the accurate transfer of data to or from a vehicle onboard computer is provided.

2. Description of Related Art

Portable electronic devices, such as cellular/mobile phones, personal digital assistants (PDAs), and hand-held computers can be used to store various personal information including, but not limited to contact information, calendar information, etc. Such information can be downloaded from other computer systems, or can be entered by way of a stylus and pressure sensitive screen or a keyboard. Desktop and laptop computers are frequently used to store similar information. Numerous computing devices can be used to store such information. For example, contact and calendar information can also be stored in a vehicle—more specifically, such data-can be stored on the vehicle onboard computer system.

The increasing number of electronic devices on which the user can store information can lead to the generation of separate and discrete sets of information on the vehicle onboard computer, portable devices, etc., which can lead to the disorganization of such information. Therefore it is desirable to synchronize data across multiple computers and devices (i.e., the user's car, devices, and Personal Information Manager (PIM) applications like Microsoft Outlook, Microsoft Notes, etc. have copies of the same data), thereby avoiding the need to fumble through various devices to locate the desired contact or calendar information. Synchronizing such data on a vehicle onboard computer system would also enhance the ease-of-use of personal address/calendar data on the vehicle navigation systems and telephony systems by eliminating troublesome entry work and would allow users to select the synchronized data for use in routing in a navigation system or dialing in a telephony system.

However, the synchronization and device data management has generally been spread among many different standards, proprietary formats, and interfaces that vary from device-to-device and manufacturer-to-manufacturer. Accordingly, it is desirable to provide a system and method for synchronizing personal and calendar data across multiple computers and devices, regardless of whether the computers and devices have different standards or proprietary formats. In particular, with the increased sophistication of vehicle onboard computer systems, there is a need for a system and method for synchronizing personal data stored on vehicles with the data stored on other devices, such as cellular/mobile phones, PDAs, remotely located computers, etc in order to allow access to the personal data on a vehicle navigation system or hands free telephone.

SUMMARY OF THE INVENTION

The present invention provides a system for synchronizing personal and calendar data between an onboard vehicle computer system and one or more other devices, such as a portable device (e.g., cell phone or personal digital assistant) or a remote computer for use in a navigation system or hands free telephone. While data synchronization systems have been used to locally synchronize data (e.g., names and phone numbers) with cellular/mobile phones or personal digital assistants (PDAs) in the vehicle onboard environment, they have not heretofore been successfully adapted to synchronize larger amounts of data or richer data sets, nor have they been adapted to synchronize data with remotely located computer systems for use in a navigation system.

In accordance with one aspect of the embodiments described herein, there is provided a system for synchronizing data for use in a navigation system comprising a computing device and a vehicle onboard computer system. The computing device comprises an associated communication subsystem adapted for wireless communications, a user interface permitting entry of address data, and a memory adapted to store the address data entered. The vehicle onboard computer system comprises an associated communication subsystem adapted for wireless communications with the computing device and a memory adapted to locally store address data. The vehicle onboard computer system further comprises a navigation system having an associated user interface adapted to allow for selection of an address from the stored address data. The navigation system is adapted to calculated a route based upon the selected address and to display the calculated route on the associated user interface. The vehicle onboard computer system is-further adapted to synchronize the locally stored address data with the address data of the computing device using an information synchronization protocol. Changes or additions to the address data in the computing device are synchronized with the locally stored address data of the vehicle onboard computer system, thereby facilitating selection of addresses for route calculation by the navigation system.

In accordance with another aspect of the embodiments described herein, there is provided a system for synchronizing address data for use in a navigation system comprising a hosted synchronization server, a mobile device, and a vehicle onboard computer system. The hosted synchronization server comprises an associated communication subsystem adapted for communication over an Internet connection and a memory adapted to store address data. The mobile device comprises an associated first communication subsystem adapted for communication over an Internet connection with the hosted synchronization server and an associated second communication subsystem adapted for wireless communications. The vehicle onboard computer system comprises an associated communication subsystem adapted for wireless communications with the mobile device and a memory adapted to locally store address data. The vehicle onboard computer system is further adapted to communicate with the hosted synchronization server through the wireless connection to the mobile device. The vehicle onboard computer system further comprises a navigation system having an associated user interface adapted to allow for selection of an address from the stored address data. The navigation system is adapted to calculate a route based upon the selected address and to display the calculated route on the associated user interface. The vehicle onboard computer system is further adapted to synchronize the locally stored address data with the address data of the hosted synchronization server using an information synchronization protocol. Changes or additions to the address data in the hosted synchronization server are synchronized with the locally stored address data of the vehicle onboard computer system, thereby facilitating selection of addresses for route calculation by the navigation system.

In accordance with another aspect of the embodiments described herein, there is provided a method for synchronizing personal data between a vehicle onboard computer and a portable device comprising the steps of: (a) inquiring the portable device as to which synchronization protocol is needed to synchronize personal data stored in memory of a vehicle onboard computer with personal data stored in memory of the portable device; (b) selecting the needed synchronization protocol from a plurality of available synchronization protocols stored in the memory on the vehicle onboard computer; (c) synchronizing the personal data on the vehicle onboard computer with the personal data on the portable device using the selected synchronization protocol to create a common set of personal data; and (d) storing the common set of personal data on the memory of the vehicle onboard computer and the memory of the portable device.

In accordance with another aspect of the embodiments described herein, there is provided a method for synchronizing personal data between a vehicle onboard computer and a remotely located computer comprising the steps of: (a) inquiring the remotely located computer as to which synchronization protocol is needed to synchronize personal data stored in memory of a vehicle onboard computer with personal data stored in memory of the remotely located computer; (b) selecting the needed synchronization protocol from a plurality of available synchronization protocols stored in the memory on the vehicle onboard computer; (c) synchronizing the personal data on the vehicle onboard computer with the personal data on the remotely located computer using the selected synchronization protocol to create a common set of personal data; and (d) storing the common set of personal data on the memory of the vehicle onboard computer and the memory of the remotely located computer.

A more complete understanding of the system and method for synchronizing personal data on an vehicle onboard computer with data on a portable device and/or remote computer will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 1B illustrates the differences in the data storage abilities of legacy device phonebooks and other newer device address books.

FIG. 1C is a block diagram that illustrates differences in the algorithms and standards implemented in the current invention and in the existing art.

DETAILED DESCRIPTION OF THE PREFERRED EMBODIMENT

The present invention satisfies the need for a system and method for locally synchronizing personal data on a vehicle onboard computer with data on a portable device (e.g., cellular/mobile phone or PDA). Additionally, the present invention satisfies the need for a system and method for remotely synchronizing personal data on a vehicle onboard computer with data on a hosted synchronization server for use in a navigation system. The data can comprise but is not limited to address book contact information and/or calendar information. The data can also comprise to-do lists, notes, emails, etc. The type of data to be synchronized is dependent on the application. Provided that both ends of the system understand the format of the data, the system is not limited to any of the aforementioned data types. For example, a car company could choose to synchronize user vehicle preference settings. The synchronized personal data such as addresses and telephone numbers can then be used on the vehicle onboard computer to navigate to specific addresses using a navigation system or make telephone calls using a hands free telephone system. In the detailed description that follows, like element numerals are used to describe like elements illustrated in one or more of the figures.

Figure 1A:
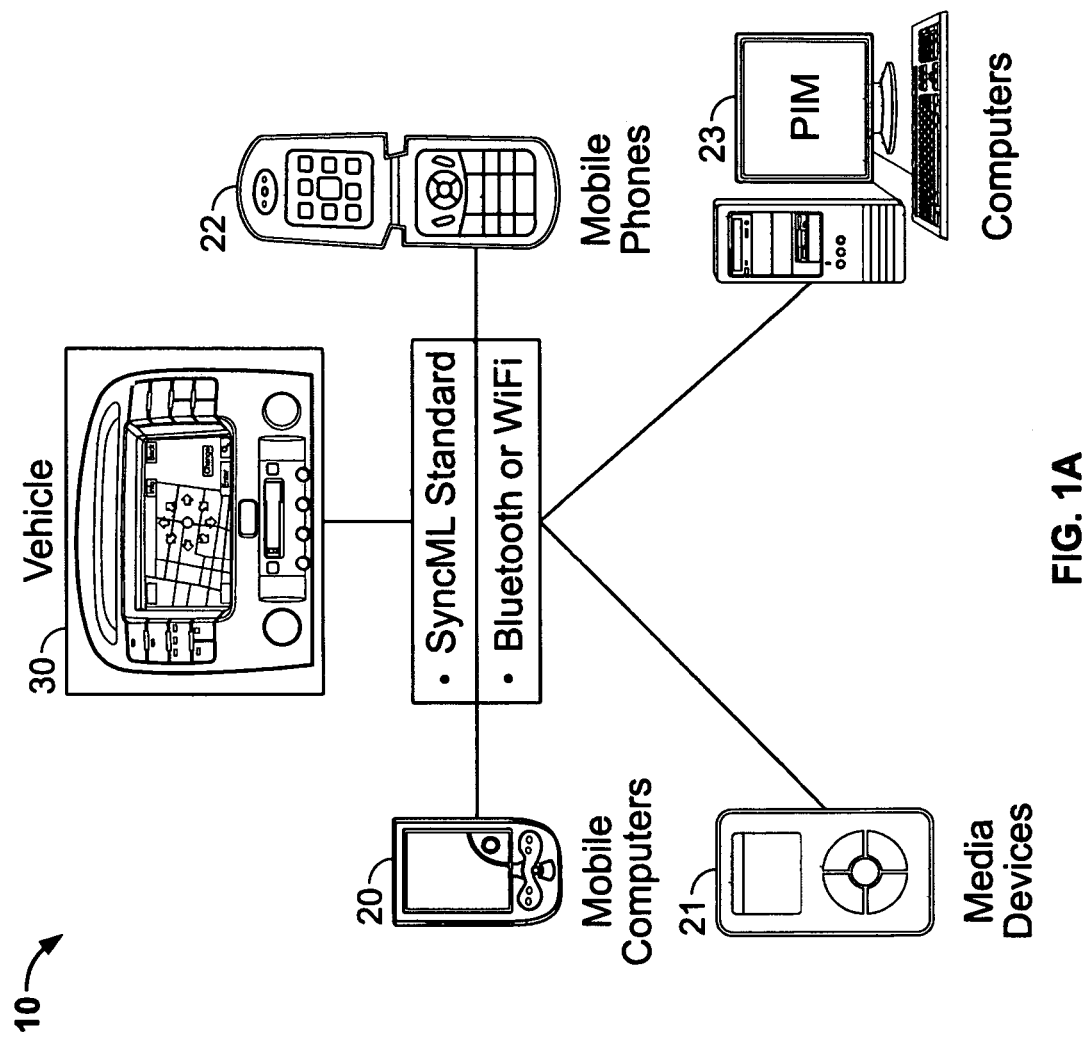
FIG. 1A is a block diagram of an embodiment of a system for locally and remotely synchronizing data on a vehicle onboard computer.

FIG. 1A provides an overview of an exemplary system 10 for locally synchronizing personal data on a vehicle onboard computer system 30, a PDA 20, cellular/mobile phone 22, a portable music player 21, and a computer 23. The vehicle onboard computer system 30 typically comprises an information/telematics platform that is connected to a vehicle navigation system, wherein the navigation system comprises a human machine user interface, such as a touch screen. The vehicle onboard computer system 30 is in communication With one or more portable devices 20, 22, which are preferably enabled with Bluetooth or a similar short range wireless communication protocol.

In accordance with one aspect of the embodiments described herein, there is provided a system for synchronizing personal data on a vehicle onboard system with one or more devices, wherein the synchronized data is not limited to name and phone number information. Rather, the synchronized data can comprise information relating to contact addresses and emails, point of interest (POI) information, etc. With the phonebook of legacy devices, it is only possible to transfer names and numbers to a Hands Free Telephone unit. Newer devices allow for storage and entry of additional information such as contact addresses, email addresses, etc. By utilizing sophisticated data transfer/synchronization protocols, such as Synchronization Markup Language (SyncML), it is possible to synchronize large amounts and varying types of data between two or more devices (See FIGS. 1B and 1C).

SyncML refers to the open industry initiative for developing and promoting a common data synchronization protocol. SyncML is alternatively known as Open Mobile Alliance Data Synchronization initiative (OMA-DS). Prior to SyncML, synchronization and device data management was spread amongst many standards, proprietary formats, and different interfaces that varied from device-to-device and manufacture-to-manufacturer. SyncML has been adopted by the industry as an open, universal standard protocol for transferring data and personal information across multiple networks, platforms, and devices. SyncML is based on XML, and therefore does not have any operating system or programming language constraints. SyncML is extensible (through XML) to respond to the need for future change and/or retain backwards compatibility.

In an exemplary embodiment of the invention, a vehicle operator has a mobile telephone 22 containing personal contact data such as addresses and telephone numbers and a home computer 23 running Microsoft Outlook™ also containing personal contact data. Having spent the time to manually enter all of the personal contact data into the home computer 23 and/or mobile telephone 22, the vehicle operator does not want to enter the data a third time into the vehicle onboard computer 30 for making telephone calls to specific phone numbers or navigating to a specific address. The vehicle operator wishes to synchronize the personal data from the mobile telephone 22 and the home computer 23 to the vehicle onboard computer 30. In the exemplary embodiment, the vehicle operator parks the vehicle in a garage in the vicinity of the home computer 23 and the mobile telephone 22 and uses the touchscreen interface to the vehicle onboard computer 30 to request a manual synchronization with the personal data of both the home computer 23 and the mobile telephone 22. The vehicle operator may select what data should be synchronized. Upon the manual request for synchronization, the vehicle onboard computer 30 communicates wirelessly via a Bluetooth connection (or any short range wireless communication connection) with both the mobile telephone 22 and the local home computer 23 and synchronizes the data according to the SyncML information synchronization protocol. It should be appreciated that the data may be synchronized using any information synchronization protocol, information synchronization standard, or information transfer protocol. The vehicle onboard computer system then contains in memory the personal data selected to be synchronized and the vehicle operator may select a specific address for the navigation system to route to or a specific telephone number to make a call to using the hands free telephone located on the vehicle onboard computer 30.

Figure 2:
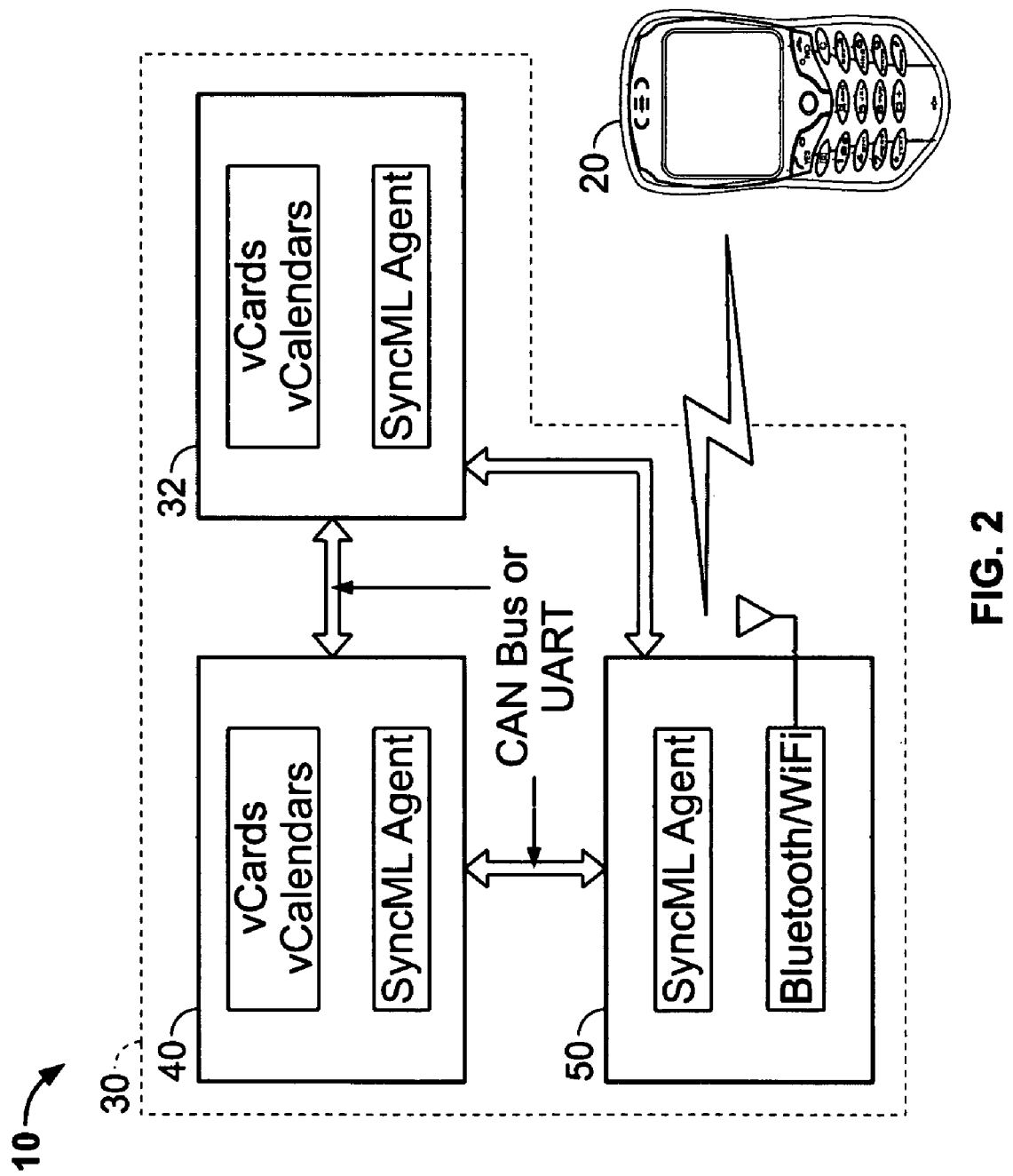
FIG. 2 is a block diagram of an embodiment of a system for synchronizing data locally between a portable device and a vehicle onboard computer.

In one embodiment, shown in FIG. 2, the vehicle onboard computer system 30 comprises a navigation system 32 that is in electronic communication with an information/telematics platform 40, which is in turn in electronic communication with a Hands Free Telephone (HFT) unit 50. The HFT unit 50 is also in communication with the navigation system 32. The navigation system 32 and/or the information/telematics platform 40 preferably comprises a memory module for storing personal data such as contact and calendar information (e.g., vCards, VCalendars, etc.). In a preferred embodiment, data is stored in either the navigation system 32 or the information/telematics platform 40 depending on uses best served and the best final architecture. It should be appreciated that the HFT may be co-located in the same vehicle onboard computer system as the navigation system or may be one and the same onboard computer system.

The information/telematics platform 40, navigation system 32, and HFT unit 50 can (if the HFT 50 is external) communicate with each other via a Controller Area Network (CAN) bus or Universal Asynchronous Receiver/Transmitter (UART) (e.g., serial link), or another type of link or bus system suitable for such communications. One or more of the group consisting of navigation system 32, information/telematics platform 40, and HFT 50, includes a SyncML agent (i.e., a SyncML client/server). In a preferred embodiment, only one of the group consisting of navigation system 32, information/telematics platform 40, and HFT 50, includes a SyncML agent/client/server. The SyncML agent could be in the information/telematics platform 40, the HFT 50, or the navigation system 32, depending on the best final architecture and use case needs; however, it is preferable to have only one such agent in the vehicle onboard computer system 30 of the vehicle.

Figure 11:
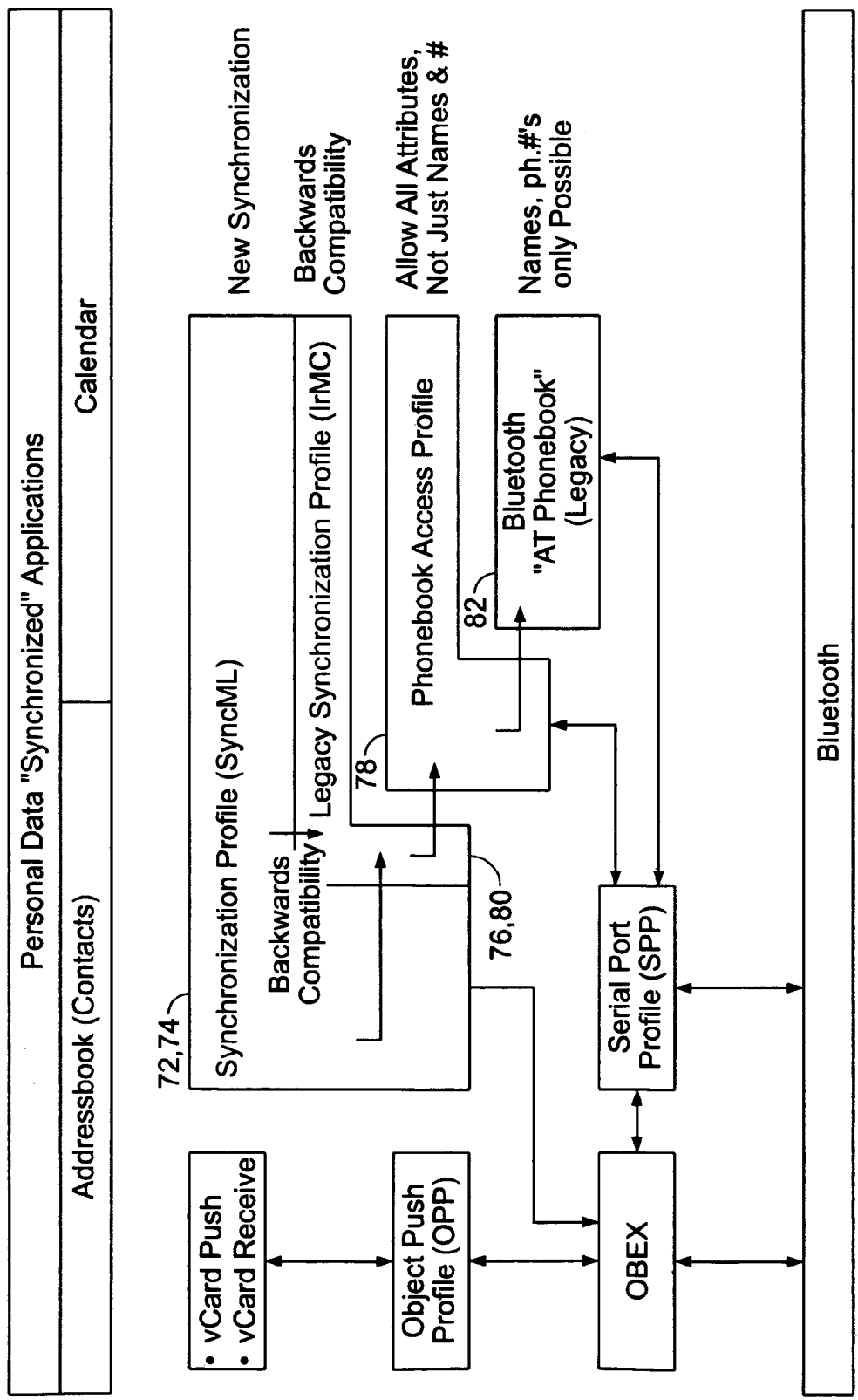
FIG. 11 is a block diagram of one embodiment of a system for local data synchronization.

In an exemplary embodiment, the data synchronization system 10 comprises a vehicle onboard system 30 configured to synchronize directly with the portable device 20. Here, the portable device comprises a PDA; however, it will be understood that the portable device can comprise a cellular/mobile phone or similar type of device. The HFT unit 50 comprises a short range wireless communication module (i.e., Bluetooth or WiFi) for wirelessly transmitting and receiving data from the PDA 20. The PDA 20 may periodically synchronize with the vehicle onboard system 30 via the HFT unit 50 when located in the vicinity. The vehicle operator may manually request synchronization of the PDA 20 via a user interface connection with the vehicle onboard system 30. The PDA 20 may be synchronized with the vehicle onboard system 30 by communicating with each other using the SyncML standard protocol. It should be appreciated, that other communications standards known in the art may be used instead of SyncML. All personal data or a subset selected by the vehicle operator may be synchronized with the PDA 20. In one embodiment, the PDA 20 is set to automatically synchronize when connected or brought within the vicinity of the vehicle. Device 20 can also be used as a HFT device in the car. In one embodiment, the vehicle onboard system 30 automatically detects, via the Bluetooth connection, the information synchronization protocol used on the PDA 20 as will be discussed in further detail below (see FIGS. 11 and 12).

With continued reference to FIG. 2, there are three system layers. At the application level, there is provided the application in the information/telematics platform 40 or navigation system 32 that interacts with the user. At the middleware level, there is provided a synchronization engine and synchronization algorithms, such as SyncML or the like, or combinations thereof, described in further detail below (see FIG. 10). At the hardware level, there is provided the hardware/software in the information/telematics platform 40 and/or the navigation system 32, such as Bluetooth, WiFi, etc.

Figure 3:
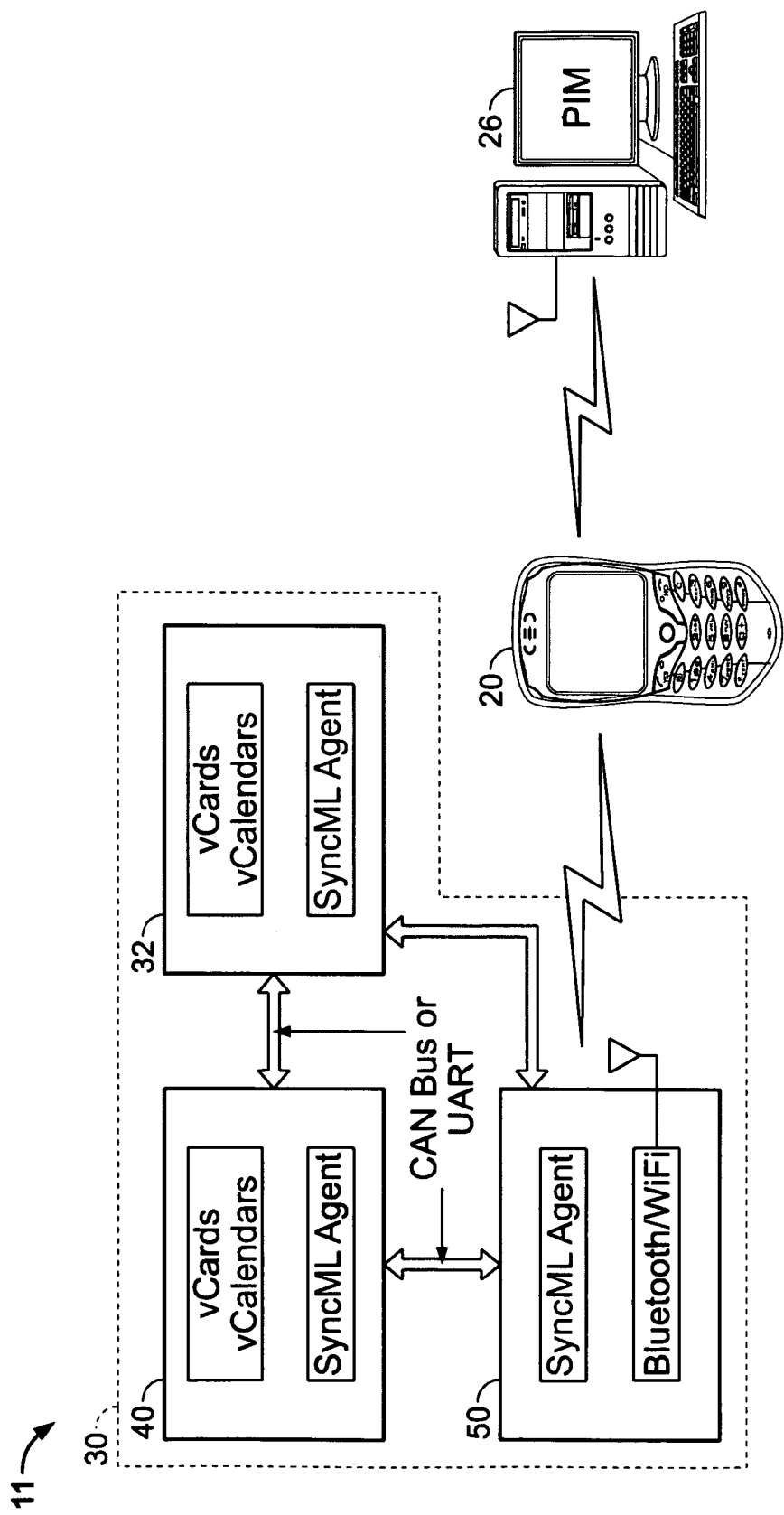
FIG. 3 is a block diagram of an embodiment of a system for synchronizing data between a PIM and a portable device, and between the portable device and a vehicle onboard computer.

In another embodiment, shown in FIG. 3, the synchronization system 11 comprises a vehicle onboard system 30, portable device 20 and PIM 26 installed on a local computer. The vehicle onboard system 30 is as described in detail above in the description of FIG. 2. Portable device 20 periodically synchronizes with the vehicle onboard system 30 via the HFT unit 50, and also periodically synchronizes with a PIM 26 installed on a local computer. Device 20 can be set to automatically synchronize when connected or brought within the vicinity of the vehicle. The PDA 20 may be synchronized with the vehicle onboard system 30 and the PIM 26 by communicating using the SyncML standard protocol. It should be appreciated, that other communications standards known in the art may be used instead of SyncML. All personal data or a subset selected by the vehicle operator may be synchronized with the PDA 20. Device 20 can also be used as an HFT device in the car.

Figure 4:
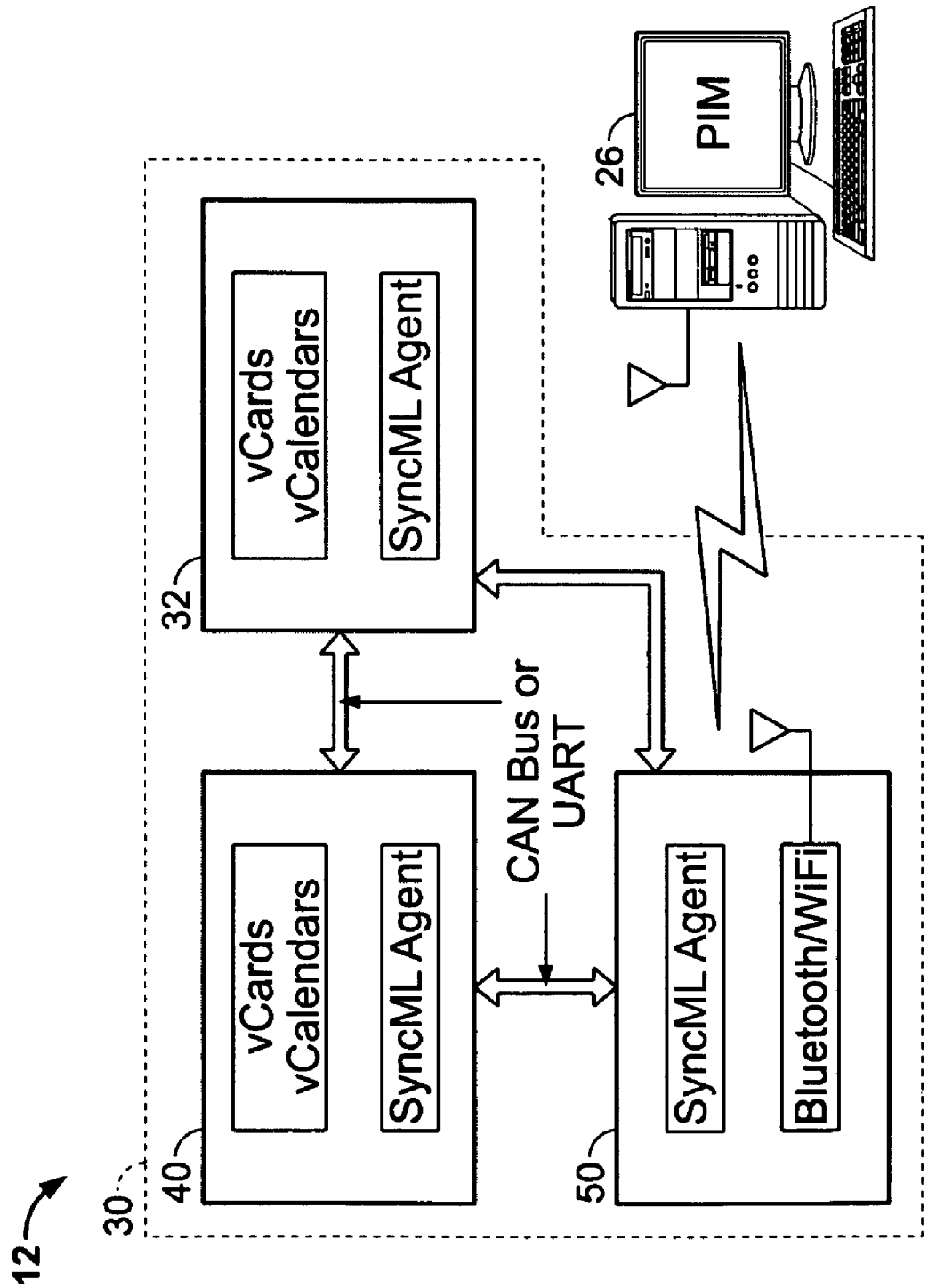
FIG. 4 is a block diagram of an embodiment of a system for synchronizing data between a PIM and a vehicle onboard computer.

In yet another embodiment, shown in FIG. 4, the synchronization system 12 comprises a vehicle onboard system 30 and a PIM 26 installed on a local computer. The vehicle onboard system 30 is as described in detail above in the description of FIG. 2. The PIM 26 periodically synchronizes with the vehicle onboard system 30. There may not be a compatible mobile device that synchronizes with the PIM 26. The PIM 26 may be synchronized with the vehicle onboard system 30 by communicating with each other using the SyncML standard protocol. It should be appreciated, that other communications standards known in the art may be used instead of SyncML. All personal data or a subset selected by the vehicle operator may be synchronized with the PIM 26.

Figure 5:
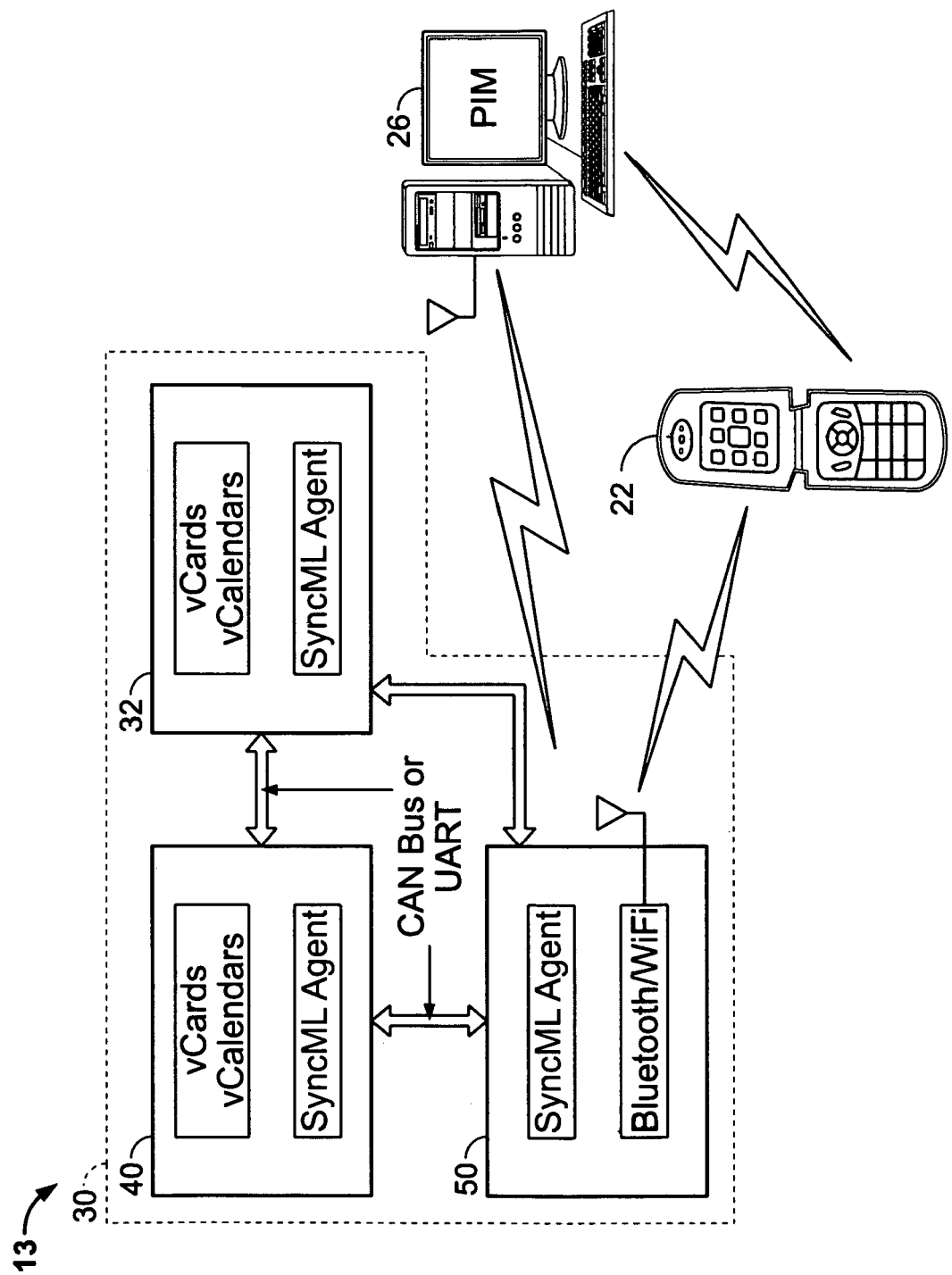
FIG. 5 is a block diagram of an embodiment of a system for synchronizing data between a PIM and a vehicle onboard computer, and between a portable device and the vehicle onboard computer.

In still another embodiment, shown in FIG. 5, the synchronization system 13 comprises a vehicle onboard system 30, cellular/mobile telephone 22 and PIM 26 installed on a local computer. The vehicle onboard system 30 is as described in detail above in the description of FIG. 2. The vehicle onboard system 30 periodically synchronizes with the PIM 26 and likewise, also periodically synchronizes with the cellular/mobile telephone 22. The cellular/mobile telephone 22 may also periodically synchronize with directly with the PIM 26. The cellular/mobile telephone 22, vehicle onboard system 30, and the PIM 26 may be synchronized with each other by communicating using the SyncML standard protocol. It should be appreciated, that other communications standards known in the art may be used instead of SyncML. All personal data or a subset selected by the vehicle operator may be synchronized with the cellular/mobile telephone 22 and PIM 26.

Figure 6:
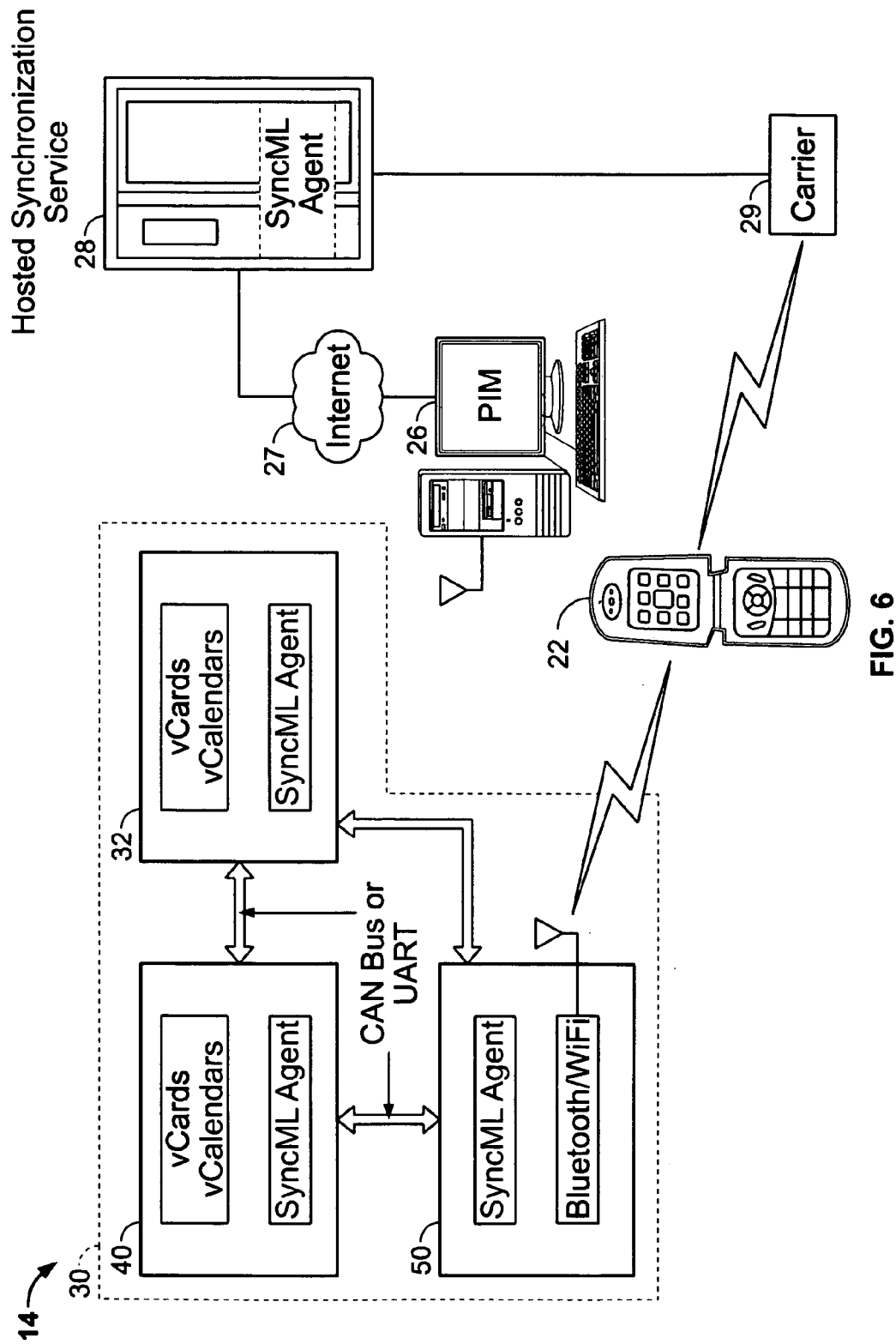
FIG. 6 is a block diagram of an embodiment of a system for synchronizing data between a PIM and a server, between a portable device and the server, and between the portable device and the vehicle onboard computer.

In another embodiment, shown in FIG. 6, the synchronization system 14 comprises a vehicle onboard system 30, cellular/mobile telephone 22, PIM 26 installed on a remotely located computer, and hosted synchronization server 28. The vehicle onboard system 30 is as described in detail above in the description of FIG. 2. The hosted synchronization server 28 communicates with the PIM 26 over the internet 27 and with the cellular/mobile telephone 22 over a cellular/mobile carrier network 29. The hosted synchronization server 28 may be used to backup data from both the PIM 26 and the cellular/mobile telephone 22. The PIM 26 and the cellular/mobile telephone each periodically synchronizes with the hosted synchronization server 28. The cellular/mobile telephone 22 also periodically synchronizes with the vehicle onboard system 30. The cellular/mobile telephone 22, vehicle onboard system 30, hosted synchronization server 28, and the PIM 26 may be synchronized by communicating using the SyncML standard protocol. It should be appreciated, that other communications standards known in the art may be used instead of SyncML. All personal data or a subset selected by the vehicle operator may be synchronized with the cellular/mobile telephone 22.

Figure 7:
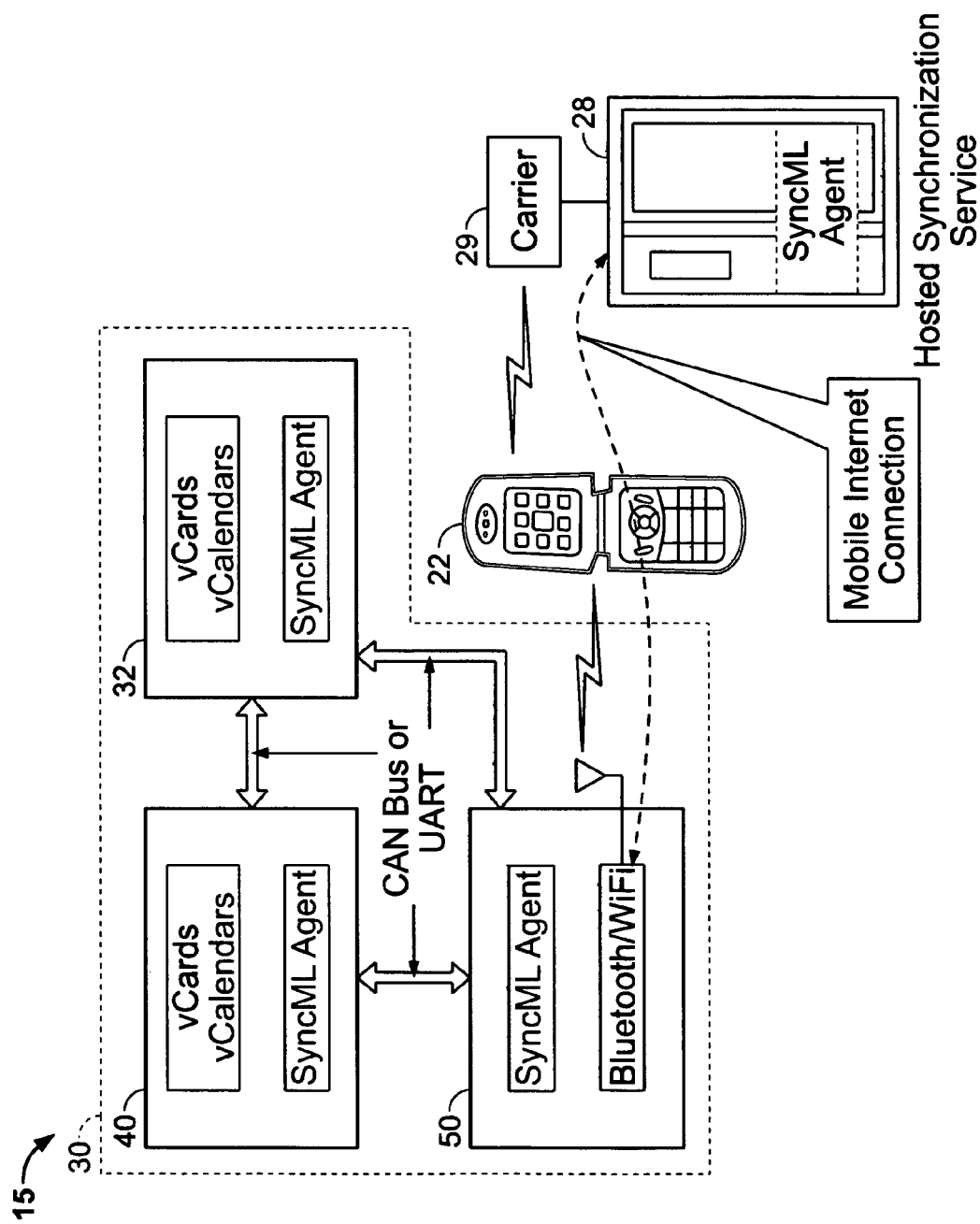
FIG. 7 is a block diagram of an embodiment for remotely synchronizing data on a vehicle onboard computer.

In accordance with another aspect of the embodiments described herein, there is provided a system for distributed or remote synchronization. The user may synchronize the car to the hosted synchronization server 28 as just another device, much like a PDA, telephone, or desktop/laptop computer would synchronize to such a server. The user may synchronize only the vehicle or the user may synchronize one or more PIMs and/or portable devices to the server(s). In one embodiment, shown in FIG. 7, the synchronization system 15 comprises a vehicle onboard system 30, cellular/mobile telephone 22, and hosted synchronization server 28. The vehicle onboard system 30 is as described in detail above in the description of FIG. 2. The hosted synchronization server 28 communicates directly with the HFT unit 50 of the vehicle onboard system 30 via a mobile internet connection utilizing cellular/mobile telephone 22. The hosted synchronization server 28 may also periodically synchronize with a cellular/mobile telephone 22 via cellular/mobile carrier network carrier 29. The telephone 22 synchronizes with the HFT unit 50. The HFT unit 50 can be integrated into or external to the information/telematics platform 40. The cellular/mobile telephone 22, vehicle onboard system 30, and hosted synchronization server 28 may be synchronized with each other by communicating using the SyncML standard protocol. It should be appreciated, that other communications standards known in the art may be used instead of SyncML. All personal data or a subset selected by the vehicle operator may be synchronized with the cellular/mobile telephone 22 and hosted synchronization server 28. It should appreciated that the term "server" may refer to an instance of software on a host computer, a multiplicity of server instances in a distributed computing environment, or may alternatively imply hardware. The minimum requirement is one instance of a hosted synchronization server accessible to the client/agent over the network technology.

Figure 8:
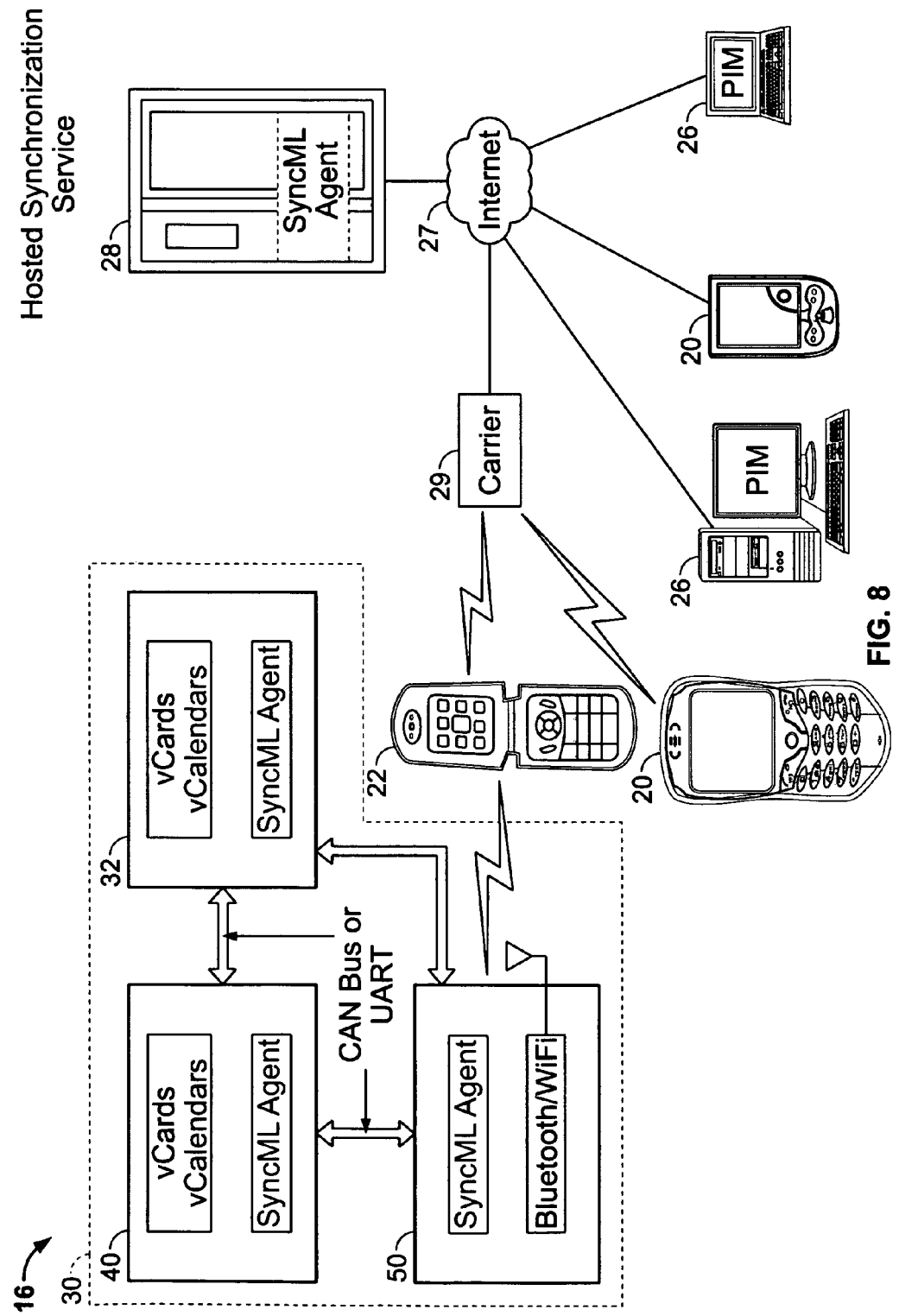
FIG. 8 is a block diagram of another embodiment of a system for remotely synchronizing data on a vehicle onboard computer.

In another embodiment, illustrated in FIG. 8, synchronization system 16 comprises a vehicle onboard system 30, multiple portable devices 20, 22, multiple PIMs 26 installed on remotely located computers, and hosted synchronization server 28. The vehicle onboard system 30 is as described in detail above in the description of FIG. 2. The vehicle onboard system 30, multiple portable devices 20, 22, and multiple PIMs 26 each synchronize via the internet 27 to the hosted synchronization server 28. The portable devices 20, 22, PIMs 26, vehicle onboard system 30, and hosted synchronization server 28 may be synchronized by communicating using the SyncML standard protocol. It should be appreciated, that other communications standards known in the art may be used instead of SyncML. All personal data or a subset selected by the vehicle operator may be synchronized with the cellular/mobile telephone 22 and hosted synchronization server 28.

Figure 9:
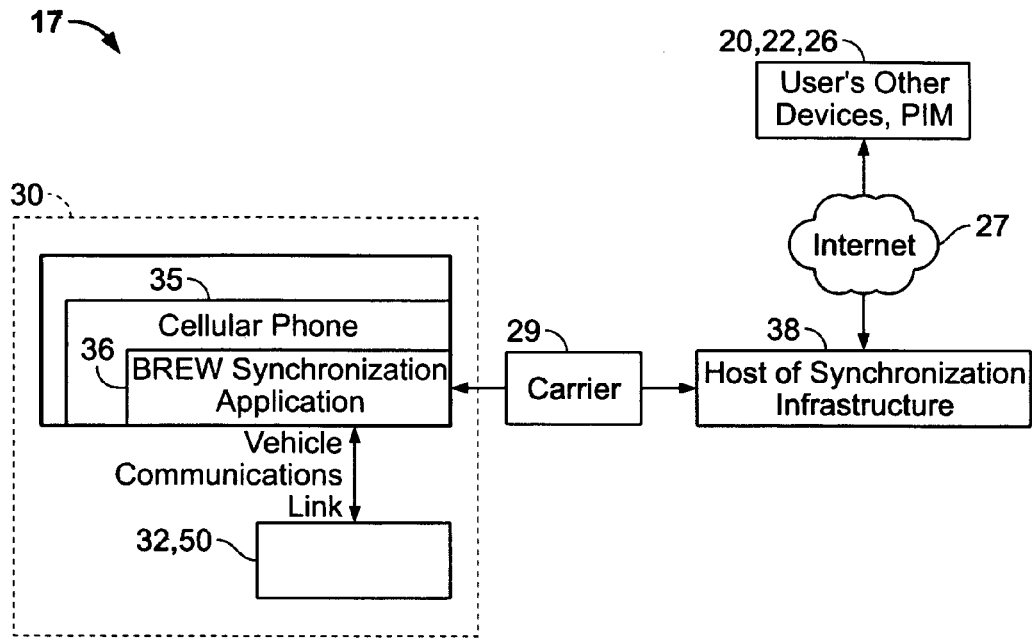
FIG. 9 is a block diagram of an embodiment of a system that comprises a vehicle onboard computer with a built in phone for communicating with a host synchronization infrastructure.

In yet another embodiment, shown in FIG. 9, synchronization system 17 comprises a vehicle onboard system 30, multiple portable devices 20, 22, PIM 26, and host of synchronization infrastructure 38. The vehicle onboard system 30 comprises a cellular/mobile phone 35, and a Qualcomm Binary Runtime Environment for Wireless (BREW) Synchronization Application 36, through which the user uses the communication capabilities of the phone to synchronize the vehicle onboard system 30 with portable devices 20, 22 and PIMs 26 via a cellular/mobile carrier network 29 that allows communication with a host of synchronization infrastructure 38. BREW is a wireless platform, typically used on Code Division Multiple Access (CDMA) devices, that offers a method for executing software applications on a mobile device. It will be understood that similar runtime environment platforms, such as Java, can be used to execute applications on the portable devices 20, 22. The portable devices 20, 22 and PIMs 26 in system 17 preferably communicate with each other over the infrastructure 38 via a cellular/mobile network 29 and/or the internet 27. The BREW application interfaces with the navigation system 32 and HFT unit 50 via the vehicle communications link. The navigation system 32 and HFT unit 50 operate similarly as described above in the description of FIG. 2.

In accordance with another aspect of the embodiments described herein, there is provided a method of synchronizing personal data between a vehicle onboard computer and one or more portable devices, and/or local PIMs. The synchronization method generally comprises inquiring a portable device and/or a local computer on which a PIM is running as to best determine which synchronization protocol or algorithm is needed to synchronize the data between the vehicle onboard computer, the portable device, and the local computer. The method further comprises selecting the needed algorithm from a plurality of available synchronization algorithms stored on the vehicle onboard computer, portable device, or local computer. It should be appreciated that the data may be synchronized using any information synchronization protocol, information synchronization standard, or information transfer protocol.

Figure 10A:
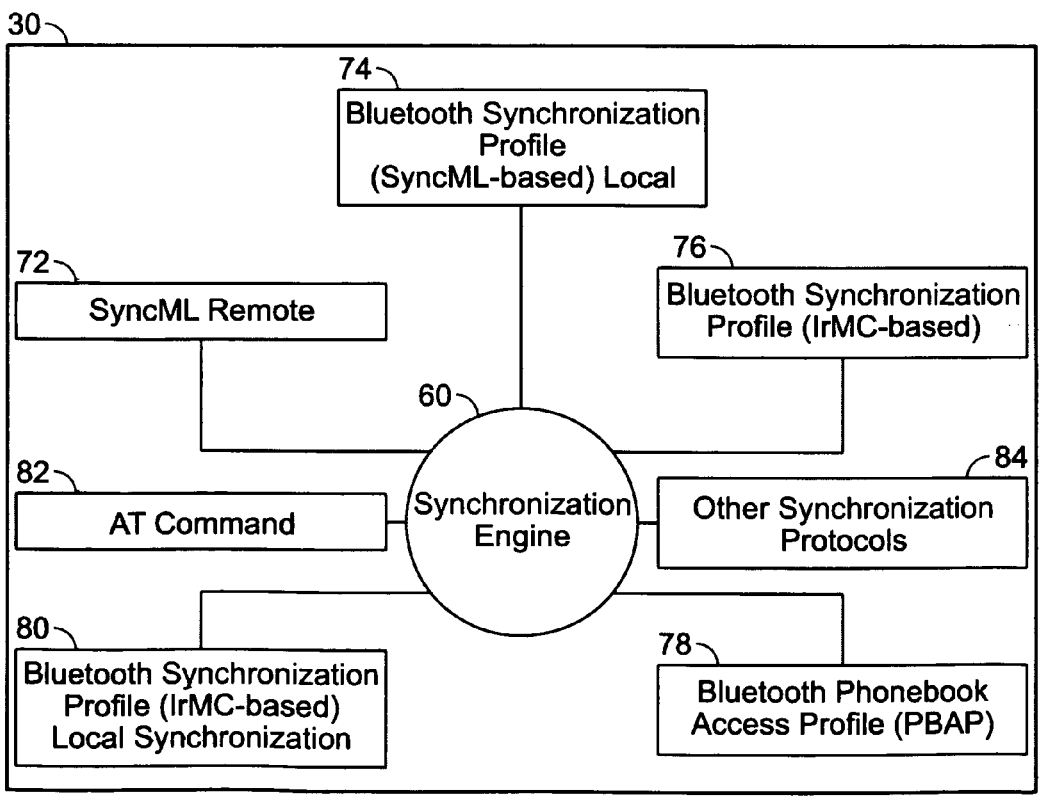
FIG. 10A is a block diagram of one embodiment of a system that comprises a plurality of synchronization protocols or algorithms for synchronizing personal and calendar data between a vehicle onboard computer and a portable device and/or a remotely located PIM.
Figure 10B:
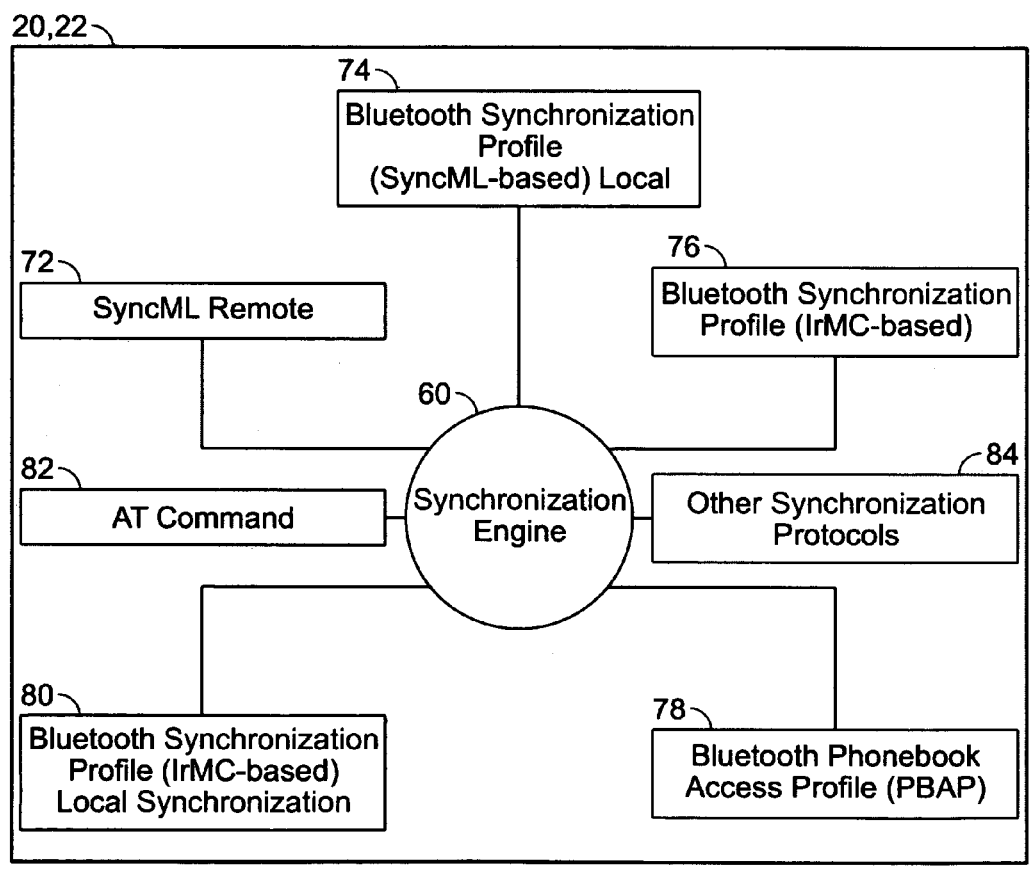
FIG. 10B is a block diagram of another embodiment of a system that comprises a plurality of synchronization protocols or algorithms for synchronizing personal and calendar data between a vehicle onboard computer and a portable device and/or a remotely located PIM.

In one approach, illustrated in FIGS. 10A and 10B, the plurality of available synchronization algorithms are stored on the vehicle onboard computer 30 of the vehicle and the plurality of algorithms comprises SyncML Remote 72. In another approach, the plurality of algorithms comprises Bluetooth Synchronization ("Sync") Profile (SyncML-based) Local 74. In yet another approach, the plurality of algorithms comprises Bluetooth Synchronization Profile (IrMC-based) 76. In still another approach, the plurality of algorithms comprises access to information on the device by AT commands and responses 82. The plurality of algorithms may also comprise Bluetooth Phonebook Access Profile (PBAP) 78, Bluetooth Synchronization Profile (IrMC-based) Local Synchronization 80 or the like. The plurality of algorithms can comprise other Synchronization protocols 84, including but not limited to Microsoft ActiveSync.

The synchronization engine 60 and the plurality of synchronization algorithms/protocols are preferably stored on the HFT unit 50 and/or the navigation system 32 of the vehicle onboard system 30. In one embodiment, show in FIG. 10A, the synchronization engine 60 and the synchronization protocols are stored on the vehicle onboard system 30. In another embodiment, shown in FIG. 10B, the synchronization engine 60 and the synchronization protocols are stored on one or more portable devices 20, 22.

Once the needed algorithm is selected, the contact or calendar entry is pushed/received between the vehicle onboard system 30 and the device 20, 22 or PIM 26. "Object Push" techniques can also be used to receive and send ("push") individual cards (vCards) and calendar (vCalendar or iCal) entries, or a series thereof, to and from the navigation system 32 over Bluetooth, using such high-layer protocols as Object Push Profile (OPP).

The method of identifying the required synchronization algorithm and selecting the identified algorithm from a plurality of such algorithms can be implemented in any number of ways. In one approach to local synchronization and contact push, shown in FIG. 11, the system checks to see whether Bluetooth Synchronization (SyncML-based) Profile 72, 74 can be used to synchronize data between the two or more systems, wherein at least one of the systems comprises an onboard vehicle system 30. Next, the system checks to see if a legacy profile, such as Bluetooth Synchronization profile (IrMC-based) 76, 80, can be used to synchronize the data. If not, the system-checks to see if Bluetooth Phonebook Access Profile (PBAP) 78 can be used to synchronize or at least transfer or import the data. If not, the system then checks to see if Bluetooth "AT Phonebook" 82 can be used to synchronize the data. Again, the synchronization engine and the synchronization algorithms are preferably located in the HFT unit 50 and/or the navigation system 32 of the vehicle onboard system 30.

Figure 12:
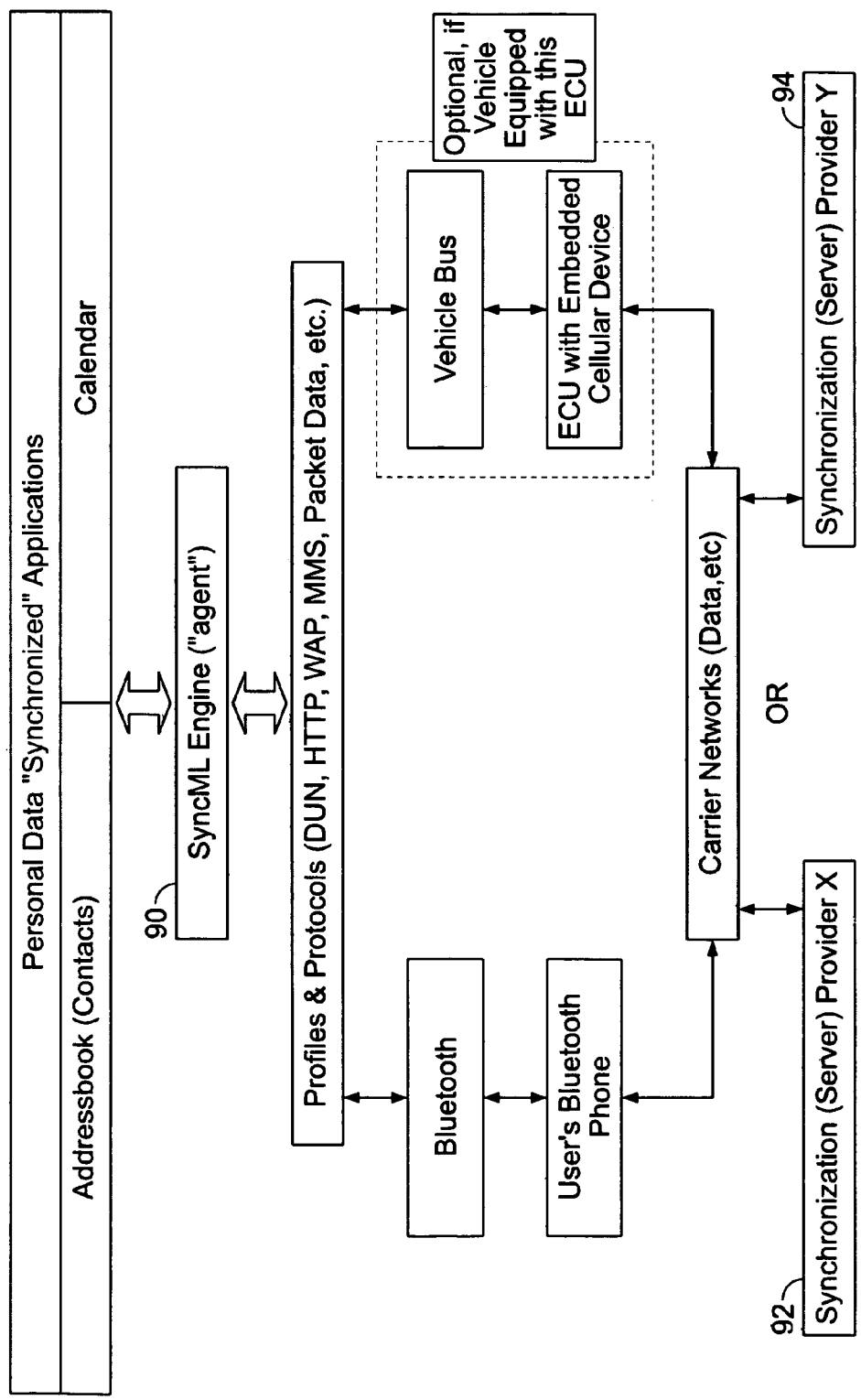
FIG. 12 is a block diagram of one embodiment of a system for remote data synchronization.

With reference to FIG. 12, in one approach to local synchronization, a SyncML engine (agent) 90 is used to push or receive data from one or more remotely located synchronization servers 92, 94. In one approach, the SyncML engine 90 is located in the vehicle electronic control unit (ECU) (e.g., navigation system 32 and/or HFT unit 50). In another approach, the SyncML engine 90 is located in a portable device (e.g., cellular/mobile phone or PDA).

The wireless synchronization of personal data that occurs between the vehicle onboard computer system and any number of other devices produces a common set or subset of personal data from the personal data stored on each individual device that that is subsequently stored on each device synchronized. The vehicle operator may choose to synchronize all personal data or just a subset of the data. The vehicle onboard computer system then allows the vehicle operator to utilize the synchronized personal data in the hands free telephone system and the navigation system. For example, the vehicle operator may place a telephone call via the hands free telephone by selecting a phone number stored in the synchronized personal data using the user interface. Likewise, the vehicle operator may navigate to a location via the navigation system by selecting an address stored in the synchronized personal data using the user interface. Furthermore, a calendar reminder or entry may contain an address, location, or telephone number of a meeting/appointment, whereby the navigation system may route to that location or address or the system may dial a telephone number or IP address in the case of telephone conference calls or web meetings. The route and/or dialing may occur automatically or manually as initiated or confirmed by the user. Additionally, a location need not be referenced only in written address form as the location may be provided in a geo-referenced format such as global Latitude and Longitude, in addition to or in the place of the written form of the address. The latter may be particularly useful when the database of the navigation system does not contain the specific named place or road link name given by the written address. Geo-referenced format may be used for a more precise routing instead of using interpolation and address numbers as is the case today. Access to the synchronized personal data from the vehicle onboard computer system allows the operator to utilize information already programmed into mobile phones or computer address books without requiring reentry of the data directly into the vehicle onboard computer system. Additionally, updates to the personal data such as a telephone number can be entered on one device and synchronized to all other devices including the vehicle onboard computer saving time in duplication of the same information. It should be appreciated that telephone data should not be limited to that which we think of it today, which is a string of digits comprising a phone number. With advancements in telephony, other information may come to represent "telephone data" such as IP address, email address (e.g., this has become commonplace in voice over internet type communication software and hardware), octets, unique names, or any other number of identifiers yet to become commonplace in telephony. It should also be appreciated that most device phonebooks can accommodate email or short message addresses in Internet/electronic format such that this information may also comprise "telephone data".

Having thus described a preferred embodiment of system for synchronizing personal data on a vehicle onboard computer system for use in a navigation system, it should be apparent to those skilled in the art that certain advantages of the within system have been achieved. It should also be appreciated that various modifications, adaptations, and alternative embodiments thereof may be made within the scope and spirit of the present invention. The invention is solely defined by the following claims.

What is claimed is:

1. A system for synchronizing address data for use in a navigation system comprising:
    a computing device comprising an associated communication subsystem adapted for wireless communications, a user interface permitting entry of address data, and a memory adapted to store the address data; and
    a vehicle onboard computer system comprising an associated communication subsystem adapted for wireless communications with the computing device and a memory adapted to locally store address data, the vehicle onboard computer system further comprising a navigation system having an associated user interface adapted to allow for selection of an address from the stored address data, the navigation system being adapted to calculate a route based upon the selected address and to display the calculated route on the associated user interface, the vehicle onboard computer system being further adapted to synchronize the locally stored address data with the address data of the computing device using an information synchronization protocol;
    wherein, changes or additions to the address data in the computing device are synchronized with the locally stored address data of the vehicle onboard computer system, thereby facilitating selection of addresses for route calculation by the navigation system.

2. The system for synchronizing address data for use in a navigation system according to claim 1, wherein the information synchronization protocol comprises Synchronization Markup Language.

3. The system for synchronizing address data for use in a navigation system according to claim 1, wherein the memory associated with the vehicle onboard computer system is further adapted to store a list of information synchronization protocols and the vehicle onboard computer system is further adapted to determine the information synchronization protocol to use during synchronization with the computing device from the list of information synchronization protocols.

4. The system for synchronizing address data for use in a navigation system according to claim 1, wherein the computing device comprises a local computer.

5. The system for synchronizing address data for use in a navigation system according to claim 4, wherein the memory associated with the computing device further comprises a personal information manager application that organizes the address data for viewing and modifications by an operator and facilitates the synchronization of the address data with the address data of the vehicle onboard computer system.

6. The system for synchronizing address data for use in a navigation system according to claim 1, wherein the computing device comprises a portable device.

7. The system for synchronizing address data for use in a navigation system according to claim 1, wherein the user interface associated with the navigation system is further adapted to allow for selection of the locally stored address data to synchronize with the address data of the computing device.

8. The system for synchronizing address data for use in a navigation system according to claim 7, wherein selection of locally stored address data to synchronize with the address data of the computing device comprises a subset of the locally stored address data.

9. The system for synchronizing address data for use in a navigation system according to claim 1, wherein the user interface associated with the computing device further permits entry of telephone data; the memory associated with the computing device being further adapted to store telephone data; the memory associated with the vehicle onboard computer system being further adapted to locally store telephone data; the vehicle onboard computer system further comprising a hands free telephone having an associated user interface adapted to allow for selection of a telephone number from the stored telephone data; the hands free telephone being adapted to generate a telephone call based upon the selected telephone number; and the vehicle onboard computer system being further adapted to synchronize the locally stored telephone data with the telephone data of the computing device using an information synchronization protocol;
    wherein, changes or additions to the telephone data in the computing device are synchronized with the locally stored telephone data of the vehicle onboard computer system, thereby facilitating selection of telephone numbers for call generation by the hands free telephone.

10. A system for synchronizing address data for use in a navigation system comprising:
    a hosted synchronization server comprising an associated communication subsystem adapted for communication over an internet connection and a memory adapted to store address data;
    a mobile device comprising an associated first communication subsystem adapted for communication over an internet connection with the hosted synchronization server and an associated second communication subsystem adapted for wireless communications; and
    a vehicle onboard computer system comprising an associated communication subsystem adapted for wireless communications with the mobile device and a memory adapted to locally store address data, the vehicle onboard computer system being further adapted to communicate with the hosted synchronization server through the wireless connection to the mobile device; the vehicle onboard computer system further comprising a navigation system having an associated user interface adapted to allow for selection of an address from the stored address data, the navigation system being adapted to calculate a route based upon the selected address and to display the calculated route on the associated user interface, the vehicle onboard computer system being further adapted to synchronize the locally stored address data with the address data of the hosted synchronization server using an information synchronization protocol;
    wherein, changes or additions to the address data in the hosted synchronization server are synchronized with the locally stored address data of the vehicle onboard computer system, thereby facilitating selection of addresses for route calculation by the navigation system.

11. The system for synchronizing address data for use in a navigation system according to claim 10, wherein the information synchronization protocol comprises Synchronization Markup Language.

12. The system for synchronizing address data for use in a navigation system according to claim 10, wherein the user interface associated with the navigation system is further adapted to allow for selection of the locally stored address data to synchronize with the address data of the hosted synchronization server.

13. The system for synchronizing address data for use in a navigation system according to claim 12, wherein selection of locally stored address data to synchronize with the address data of the hosted synchronization server comprises a subset of the locally stored address data.

14. The system for synchronizing address data for use in a navigation system according to claim 10 further comprising a computing device comprising an associated communication subsystem adapted for communication over an internet connection with the hosted synchronization server, a user interface permitting entry of address data, and a memory adapted to locally store the address data; the computing device being further adapted to synchronize the locally stored address data with the address data of the hosted synchronization server using an information synchronization protocol.

15. The system for synchronizing address data for use in a navigation system according to claim 10, wherein the memory associated with the hosted synchronization server is further adapted to store telephone data; the memory associated with the vehicle onboard computer system is further adapted to locally store telephone data; the vehicle onboard computer system further comprising a hands free telephone having an associated user interface adapted to allow for selection of a telephone number from the stored telephone data; the hands free telephone being adapted to generate a telephone call based upon the selected telephone number; and the vehicle onboard computer system being further adapted to synchronize the locally stored telephone data with the telephone data of the hosted synchronization server using an information synchronization protocol;

wherein, changes or additions to the telephone data in the hosted synchronization server are synchronized with the locally stored telephone data of the vehicle onboard computer system, thereby facilitating selection of telephone numbers for call generation by the hands free telephone.

16. A method for synchronizing personal data between a vehicle onboard computer and a portable device comprising the steps:

inquiring the portable device as to which synchronization protocol is needed to synchronize first personal data stored in a first memory of a vehicle on board computer with second personal data stored in a second memory of the portable device;

selecting the needed synchronization protocol from a plurality of available synchronization protocols stored in the first memory on the vehicle onboard computer;

synchronizing the first personal data with the second personal data using the selected synchronization protocol to create a common subset of personal data; and storing the common subset of personal data on the first memory of the vehicle onboard computer and the second memory of the portable device.

17. The method for synchronizing personal data according to claim 16, further comprising entering the first personal data into the first memory via a user interface prior to the inquiring step.

18. The method for synchronizing personal data according to claim 16, further comprising entering the second personal data into the second memory via a user interface prior to the inquiring step.

19. A method for synchronizing personal data between a vehicle onboard computer and a local computer comprising the steps:

inquiring a portable device as to which synchronization protocol is needed to synchronize first personal data stored in a first memory of a vehicle onboard computer with second personal data stored in a second memory of the local computer;

selecting the needed synchronization protocol from a plurality of available synchronization protocols stored in the first memory on the vehicle onboard computer;

synchronizing the first personal data with the second personal data using the selected synchronization protocol to create a common set of personal data; and storing the common set of personal data on the first memory of the vehicle onboard computer and the second memory of the local computer.

20. The method for synchronizing personal data according to claim 19, further comprising entering the first personal data into the first memory via a user interface prior to the inquiring step.

21. The method for synchronizing personal data according to claim 19, further comprising entering the second personal data into the second memory via a user interface prior to the inquiring step.

* * * * *